April 8, 1930. F. JOHANNSEN 1,754,169
METHOD OF RECOVERING GASIFIABLE METALS AS OXIDES
Filed Jan. 4, 1926
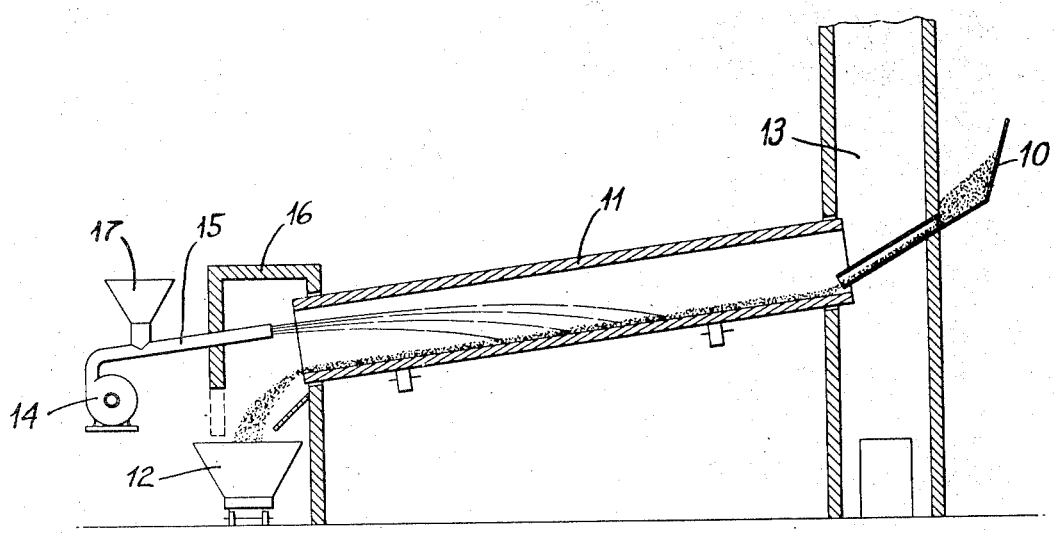
Inventor:
Friederich Johannsen
By Knight Bros
Attorneys Patented Apr. 8, 1930

1,754,169

UNITED STATES PATENT OFFICE

FRIEDRICH JOHANNSEN, OF MAGDEBURG, GERMANY, ASSIGNOR TO FRIED. KRUPP GRUSONWERK AKTIENGESELLSCHAFT, OF MAGDEBURG-BUCKAU, GERMANY, A FIRM

METHOD OF RECOVERING GASIFIABLE METALS AS OXIDES

Application filed January 4, 1926, Serial No. 79,246, and in Germany May 26, 1925.

My invention relates to metallurgical processes pertaining to the treatment of ores, slags and other metallurgical products, containing gasifiable metals as e. g. zinc, tin, lead, arsenic, bismuth, antimony, mercury, etc., the object of said processes being to extract said metals in the form of metal compounds, so-called oxides.

Extraction processes of the character under consideration commonly comprise the charging of the materials to be treated together with reducing agents and other substances, aiding in the gasification of the metals, into a metallurgical furnace, e. g. a tubular rotary furnace and heating therein.

The nature and scope of my invention will be more fully understood from the following description:

In accordance with my invention a solid reducing agent is introduced into the furnace, not with the material to be treated but separately and in such a manner that it is applied directly to the material at the reducing zone.

This method will be found to be more economical than feeding the reducing agent together with the ore into the furnace at the beginning of the operation, because with my new method it is possible to use in a highly economical manner raw, i. e. non-carbonized fuel, as e. g. anthracite, lignite etc.

Successful experiments have shown that the gases issuing from the raw fuel can be burnt directly in the zone of the reaction and that the mainly carbonized residues of the fuel will support the reducing action.

The method and means for feeding the fuel into the zone of reaction must be adapted to the structural features of the respective furnaces used.

The drawing shows a furnace in which the fuel is blown into the zone of reaction from one end of the furnace. The ore or other material from which the metal oxides are to be recovered is fed from a hopper 10 into an inclined rotary tubular furnace 11 through which it slowly travels toward the discharge end from which the treated material drops into a car 12. The upper end of the rotary furnace opens into a flue 13 through which the vapors and oxides produced in the reaction are conducted to any suitable collecting apparatus such as a baghouse (not shown). At the opposite end of the furnace is arranged a blower 14 having an exhaust pipe 15 projecting through the housing 16 surrounding the discharge end of the furnace. Upon the exhaust pipe 15 is arranged a hopper 17 into which the fuel and other materials hereinafter mentioned can be charged to be blown into the furnace. The angle of the pipe 15 and the pressure used are such that the material blown into the furnace strikes the charge in the zone at which its temperature has been raised sufficiently to cause the reduction and volatilization of the volatile metals.

With this type of furnace it is possible to control the process as desired by the use of a suitable grade of fuel to obtain either a relatively high heating effect or a more intense reducing action.

By using rather finely comminuted fuel a flame is obtained, the heating effect of which will predominate, and from which only few solid particles, having a reducing effect are thrown off, while by using fuel of coarser grading—even coke if desired—the reducing action on the ore will predominate.

By controlling the pressure under which the fuel is blown into the furnace the location and extension of the zone of reaction may be conveniently varied.

The manner in which the fuel is introduced may be varied considerably without departing from the salient ideas of my invention, and I do not wish to be limited to the particular type of furnace described hereinbefore.

By applying the fuel in the zone proper of reaction another advantage is obtained in practice, which consists therein that the temperature of the furnace gases can be lowered at will and at appropriate places.

This is accomplished by controlling the humidity content of the fuel. Since in practice it is generally desirable to avoid the premature smelting of the ores under treatment, and since a surplus of unburnt carbon content has a good stiffening effect, a relatively high fuel content of the material under treatment should be and can be easily obtained by introducing the fuel in the zone proper of reaction.

Substances necessary for stiffening the material under treatment or working it up otherwise, as e. g. limestone, sand, etc., may also be fed wholly or partly in the zone proper of reaction.

By postponing the feeding of the supplementary materials it is possible to smelt the charge before its reaching the zone of reaction, which is particularly desirable in the case of material tending to form deposits and incrustations in the furnace.

By feeding stiffening substances at the time and place specified above and simultaneously raising the temperature a semiliquid condition of the charge, which is very suitable for the reaction, is obtained.

On the other hand by feeding stiffening substances in the zone proper of reaction together and simultaneously with fuel, the temperature may be lowered if desired at said zone. This is accomplished either by applying the auxiliary substances in a cold or moist condition or by appropriately using the energy of reaction of the chemical compounds formed of the charge and the auxiliary substances or through the energy of decomposition of the limestone or other material.

In accordance with the above outlined methods in which the fuel may be introduced, the size and extent of the reaction zone, which has a relatively moderate temperature, can also be varied at will viz, by modifying the manner, in which the auxiliary substances are introduced.

The new process may be conveniently applied also to the working of rather finely graded ore and metallurgical products.

By feeding such finely graded material containing gasifiable metals into tubular rotary furnaces together with the material of coarser grading the finely graded material will dry and form dust near the intake port of the rotating furnace, which dust will be swept up by the draft passing through the furnace and thus contaminate the products.

This drawback cannot be eliminated through the addition of water because after the evaporation of the water there will be always a zone in the furnace where the charge is in a dustlike dry condition before it reaches the zone proper of reaction, until it gradually sinters at its surface in passing into zones of higher temperature.

If material of such finely graded character is introduced into the furnace with the fuel, fluxing agent or other auxiliary substances—viz, not until the charge has reached the zone proper of reaction—the semiliquid or even smelted charge will absorb the finely graded material and prevent it from becoming dustlike and being carried off by the draft passing through the furnace.

In this manner even the fuel content of said finely graded materials, e. g. carbon content of impure semi-oxides formed in the zone of reaction, can be utilized for the process.

Another welcome result consists therein that the said finely graded raw material has a lowering effect upon the temperature in the zone of reaction much the same as the auxiliary substances referred to above.

I therefore propose to charge finely graded raw material into the furnace by blowing it into the furnace simultaneously with and thus mixing it with pulverized fuel or with the auxiliary substances, as outlined hereinbefore.

In addition to the lowering effect upon the flame temperature another advantage is obtained which consists therein that the finely graded material being in a highly heated and disintegrated condition comes into intimate contact with the charge and will be easily absorbed by the latter in passing through the furnace.

It will be understood, that the metal extracting processes designed in accordance to these suggestions are susceptible of various modifications in their performance without departing from the salient features and the leading ideas of my invention, and I also do not wish to be limited to any particular type and details of construction of the furnaces used for carrying my invention to effect.

What I claim is:

1. Process of recovering gasifiable metals as zinc, tin, lead, bismuth, antimony, mercury, etc. in the form of oxides from ores, slags, and other metallurgical products of different grading including finely graded material and coarser graded material, which method comprises passing the material of coaser grading through a metallurgical furnace and heating it therein, and contacting and mixing the heated material on its progress through the furnace but not until it reaches the zone proper of reaction with said finely graded material.

2. Process of recovering gasifiable metals such as zinc, lead, bismuth, antimony, mercury, etc., in the form of oxides from ores, slags and other metallurgical products of different grades of fineness including finely graded material and coarsely graded material, which comprises passing the material of coarser grade through a metallurgical furnace, heating it therein, and contacting and mixing the heated material in its progress through the furnace, but only after it has reached the reaction zone proper, with the finely graded material and with auxiliary substances, adapted to support the gasification of the metals and aid in the further treatment of the material.

The foregoing specification signed at Berlin, Germany, this 1st day of December, 1925.

Dr. Ing. FRIEDRICH JOHANNSEN.